United States Patent [19]

Decker

[11] Patent Number: 5,685,721

[45] Date of Patent: Nov. 11, 1997

[54] REFRESHABLE BRAILLE-CELL DISPLAY IMPLEMENTED WITH SHAPE MEMORY ALLOYS

[75] Inventor: Lawrence H. Decker, Christiansburg, Va.

[73] Assignee: American Research Corporation of Virginia, Radford, Va.

[21] Appl. No.: 553,987

[22] Filed: Nov. 6, 1995

[51] Int. Cl.[6] ............................................. G09B 21/00
[52] U.S. Cl. ............................................. 434/114
[58] Field of Search .............................. 434/112, 113, 434/114; 340/407.1, 407.2

[56] References Cited

U.S. PATENT DOCUMENTS

| | | |
|---|---|---|
| 3,659,354 | 5/1972 | Sutherland. |
| 3,924,019 | 12/1975 | Jacob. |
| 3,987,438 | 10/1976 | Lindenmueler et al.. |
| 4,033,053 | 7/1977 | Engler. |
| 4,044,350 | 8/1977 | Tetiakoff et al.. |
| 4,183,683 | 1/1980 | Hiratsuka et al.. |
| 4,191,945 | 3/1980 | Hannen et al.. |
| 4,194,190 | 3/1980 | Bareau. |
| 4,266,936 | 5/1981 | Rose et al.. |
| 4,283,178 | 8/1981 | Tetzlaff. |
| 4,473,356 | 9/1984 | Fernando et al.. |
| 4,571,190 | 2/1986 | Zagler et al.. |
| 4,664,632 | 5/1987 | Tretiakoff et al. ............. 434/114 |
| 4,687,444 | 8/1987 | Garner. |
| 4,758,165 | 7/1988 | Tieman et al.. |
| 4,871,992 | 10/1989 | Petersen. |
| 4,879,698 | 11/1989 | Langberg. |
| 4,898,536 | 2/1990 | Hoffarth. |
| 5,086,287 | 2/1992 | Nutzel. |
| 5,165,897 | 11/1992 | Johnson. |
| 5,195,899 | 3/1993 | Le Blanc et al. ............. 434/114 |
| 5,222,895 | 6/1993 | Fricke. |
| 5,226,817 | 7/1993 | Nakajima et al.. |
| 5,286,199 | 2/1994 | Kipke. |
| 5,429,501 | 7/1995 | Kaplan .......................... 434/119 |
| 5,565,576 | 10/1996 | Thorner et al. ................ 434/114 |
| 5,574,576 | 11/1996 | Martin ........................... 434/114 |

FOREIGN PATENT DOCUMENTS

| | | |
|---|---|---|
| 2842916 | 4/1980 | Germany. |
| 3042390 | 7/1982 | Germany. |
| 3044599 | 7/1982 | Germany. |
| 875440 | 10/1981 | U.S.S.R.. |
| 1417026 | 8/1988 | U.S.S.R. ...................... 434/114 |
| 1756920 | 8/1990 | U.S.S.R.. |

Primary Examiner—Paul J. Hirsch
Attorney, Agent, or Firm—James Creighton Wray

[57] ABSTRACT

A refreshable braille cell display uses a single moving part per tactile element. Tactile elements, formed from stainless steel tubing, are assembled in densely arranged modules. Lower ends of the tactile elements extend beneath the modules and are in contact with a pressurized medium. Shape memory alloy actuators are positioned in the tactile elements, isolated from any motion or flow in the pressurized medium. When a pressurized medium is delivered through a port in a tactile element, the actuator extends upward, thereby forcing the upper portion of the tactile element through a hole in the user contact surface. In that state the tactile element indicates information. When the tactile element is activated, current flows from an electrical contact at the lower end of the tactile element, through the actuator, and into the outer tube of the tactile element. The actuator heats, due to electrical resistance, contracts and exerts a downward force on the pressure medium. The upper portion of the tactile element is drawn below the user contact surface, indicating the absence of information. Distributed pulse width modulation allows instantaneous power requirements to be minimized, and only low safe voltages are needed to operate the array. By applying a bias force to all actuators via a common reservoir of either pneumatic or hydraulic pressure, the design is simplified, and reliability is increased. When integrated with a computer, the refreshable tactile array of elements gives users access to full computer generated screens of text and graphical information in real time.

32 Claims, 6 Drawing Sheets

REFRESHABLE BRAILLE-CELL DISPLAY IMPLEMENTED WITH SHAPE MEMORY ALLOYS

BACKGROUND OF THE INVENTION

This invention relates to braille and graphics devices for providing individuals with visual impairments access to media through tactile communication means.

Approximately 600,000 Americans have severe visual impairments. Those impairments greatly limit employment opportunities and recreational activities available in our computer dominated society. Visually impaired workers and students are placed at distinct disadvantages, as existing refreshable braille displays only provide access to a few lines of a computer screen at a time. Limitations in existing technology prevent the visually impaired from skimming through computer generated text with an ease approaching that of sighted people. Needs exist for refreshable tactile arrays that give users access to full computer generated screens of text and graphical information in real time.

Existing refreshable braille-cell displays have multiple mechanical elements for implementing individual dots in a tactile array. Shape memory alloy actuators, when cooled, revert to an elastic state where a small bias force is required to return the alloys to their original length. Typically, that bias force is 5-10% of the force exerted by the actuator while activated. Existing displays using shape memory alloy actuators rely on individual small springs to apply that small bias force, and require individual latching mechanisms for holding the rod connected to the actuator in a raised position to signify a braille dot or tactile signal. Those latches function to withstand pressure applied by the user, and must be released when the actuator is next activated. When the element is retracted, the latch once again mechanically holds the element in place and isolates the element from contact with the user, thereby indicating the absence of a tactile signal at a given site. The mechanical intricacies of existing displays render the displays ineffective, prone to failure and expensive. Needs exist for displays having tactile elements that have a minimum of moving parts, are inexpensive and are reliable.

Existing braille displays have tactile elements that occupy considerable space, have multiple miniature components and have excessive power requirements. Reliability is low, and the legibility of text recognized is poor. Miniature components require high tolerances and complex assembly and make full page displays difficult to mass produce and repair. The physical size of existing tactile elements makes it nearly impossible to attain densely spaced, multiple line tactile arrays that approach the correct spacing for standard Braille. Power requirements of existing displays exceed 1500 watts and require special main circuits, thus confining users to specifically wired locations. Needs exist for full page braille displays that are easy to install and repair, highly reliable, and readily compatible with typical residential circuitry.

SUMMARY OF THE INVENTION

A refreshable braille cell display uses a single moving part per tactile element. Tactile elements, formed from tubing, are assembled in modules. The modules are positioned in a container. Lower ends of the tactile elements extend beneath the modules and are in contact with a pressurized medium located in a reservoir of the container. Shape memory alloy actuators are positioned in the tactile elements, isolated from any motion or flow in the pressurized medium. When a pressurized medium is delivered through a port in a tactile element, the actuator extends upward, thereby forcing the upper portion of the tactile element through a hole in the user contact surface. In that state the tactile element indicates information. When the tactile element is activated, current flows from an electrical contact at the lower end of the tactile element, through the actuator, and into the outer tube of the tactile element. The actuator heats, due to electrical resistance, contracts and exerts a downward force on the pressure medium. The upper portion of the tactile element is drawn below the user contact surface, indicating the absence of information. Distributed pulse width modulation allows instantaneous power requirements to be minimized, and only low safe voltages are needed to operate the array. By applying a bias force to all actuators via a common reservoir of either pneumatic or hydraulic pressure, the design is simplified, and reliability is increased. When integrated with a computer, the refreshable tactile array of elements gives users access to full computer generated screens of text and graphical information in real time.

A full page refreshable braille display includes an array of tactile elements. Only a portion of the array of tactile elements need to be powered simultaneously to convey readable braille text or graphical information to a user. The present invention has a minimum of supplementary mechanical devices, thus enhancing reliability, simplifying design and conserving space.

Individual tactile elements are formed from readily obtainable lengths of stainless steel tubing. Preferably each tactile element has only one moving part. The tactile elements are assembled in densely arranged modules that allow the implementation of full standard forty column by twenty-five row full-page displays. Preferably, the displays are Perkins-Brailler displays having tactile elements that are simple to construct and easily replaceable.

In preferred embodiments of the present invention, the tactile elements include shape memory alloy actuators and do not require any springs or latch mechanisms. Shape memory alloys, such as Nitinol(TM), are activated, or caused to contract, through resistive heating. Pulse width modulation is used both to control the level of resistive heating applied and to distribute the power consumed by an array of actuators over the greatest number. That distribution of power is accomplished through sequential activation of portions of an array in the time required to keep all elements of the array activated simultaneously. By selectively allowing some actuators to be omitted from the power sequence and thus not activated, it is possible to convey recognizable patterns, shapes and braille characters to a visually impaired user.

The actuators are short lengths of fine wire that are readily available from multiple suppliers. Shape memory alloy actuators operate for millions of cycles, pose a tremendous strength-to-physical size ratio, produce finely controllable, highly repeatable motion and are allow for tactile elements to be combined in dense arrays.

The height of the array of tactile elements is minimized by placing shape memory alloy actuators inside the tubing. The actuators are isolated from any motion or flow in the pressurizing medium that might effect power consumption through direct cooling. Distributed pulse width modulation allows instantaneous power requirements to be minimized. Only low safe voltages are necessary to operate the array. The individual tactile elements are self cleaning and the array vibrates periodically to free any elements that have become stuck.

The tactile elements are partially submerged in a reservoir of pressurized medium. The entire array of elements share a single reservoir. No networks of ducts and ports are needed to distribute pressurized medium throughout the array, thus further simplifying the construction and mass reproduction of the display.

Well-established printed circuit board fabrication techniques are used to provide both row and column connection of the printed circuit boards to the tactile elements and to provide printed circuit loading. Well-established assembly techniques are used to construct individual modules and to install connectors and related electronics. Molded parts can be substituted for machined parts throughout the design. The use of stainless steel tubing may eliminate the need for machining altogether.

The reservoir of pressurized medium is an enclosed region in which the lower ends of the tactile elements protrude. The pressure exerted can be either a pneumatic pressure or an hydraulic pressure.

Pneumatic pressure embodiments of the present invention have many advantages. Fluid containment is not a problem, and the display can be operated in any position. Compressed gas presents less of a cooling effect to the shape memory alloy actuators, thereby reducing power requirements. A coating, such as a titanium nitride coating, can be applied to the surfaces of the tubing to provide lubricity and wear protection. In addition, existing high efficiency compact compressor designs for delivering higher medium flow rates are compatible with the pneumatic pressure embodiments.

Hydraulic pressure embodiments require lower medium flow rates, as the viscosity of the hydraulic fluid serves to minimize leakage around the tubes. Lower flow rates allow very small low volume pumps to be used to maintain the 3-5 PSI required to operate the display. An hydraulic fluid having superior lubrication properties enhances reliability by minimizing friction between the moving tubes of the tactile element. Adequate electrical continuity is not a concern due to the close fit and large surface area between the cylinder tube portion and piston tube portion of each element. In addition, acoustic noise resulting from escaped pressurized air is not present in the hydraulic embodiments.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
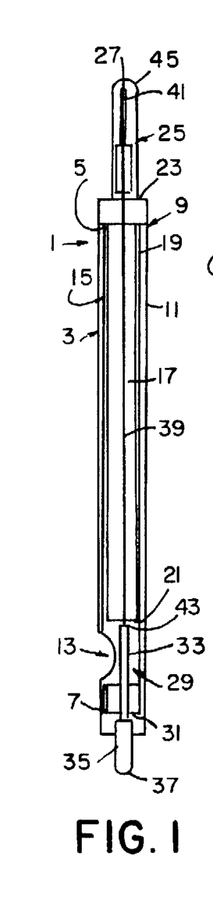
FIG. 1 shows a tactile element having a first tube section, a second tube section, a third tube section and an actuator extending the length of the element.
Figure 2:
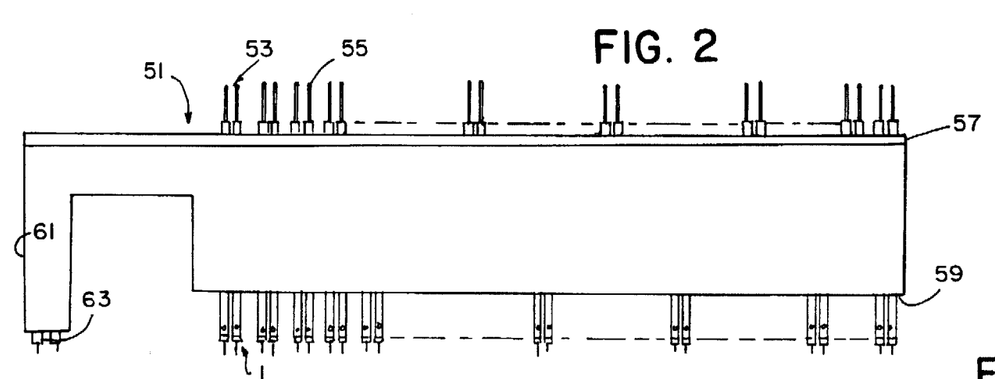
FIG. 2 shows the individual elements of FIG. 1 in an array with multiple modules.

Referring to FIG. 1, individual tactile elements 1 have three tube sections. A first tube section 3 has a top end 5, a bottom end 7, an inner diameter 9 and an outer diameter 11. Preferably, the first tube section 3 is approximately 1.25 inches in length and has an inner diameter 9 of 0.07 inches. A port 13 is positioned in the first tube section 3 near the bottom end 7. In preferred embodiments, the port 13 is approximately 0.05 inches in diameter and is centered approximately 0.2 inches from the bottom end 7.

A second tube section 15 is movably positioned in the top end 5 of the first tube section 3. Preferably, the second tube section 15 is approximately 0.75 inches in length. The second tube section 5 has a first portion 17 having an upper end 19 and a lower end 21. The first portion 17 of the second tube section 15 extends in the top end 5 of the first tube section 3. The outer diameter of the first portion 17 is slightly less than the inner diameter 9 of the first tube section 3, such that the first portion 17 slidably fits in the top end 5 of the first tube section 3. The second tube section 15 has a second portion 23 extending from the upper end 19 of the first portion 17. The second portion 23 has a diameter larger than the inner diameter 9 of the first tube section 3. That larger diameter allows only the first portion 17 of the second tube section 15 to enter the top end 5 of the first tube section 3. The second tube section 15 has a third portion 25 that extends upward from the second portion 23. The third portion 25 reduces in steps down to a very fine diameter at its uppermost point 27. Preferably, the third portion 25, at its uppermost point 27, has an internal diameter of approximately 0.006 inches.

A third tube section 29 is positioned in the bottom end 7 of the first tube section 3. The third tube section 3 includes a hypodermic-sized tubing positioned in the bottom end 7 of the first tube section 3 such that a short portion 31 of the third tube section 29 extends downward beneath the bottom end 7 of the first tube section 3. A nonconductive bushing 35 surrounds the upper portion 33 third tube section. The bushing 35 is force fitted into the bottom end 7 of the first tube section 3, thereby holding the third tube section 29 securely in place. Preferably, the third tube section 29 is approximately 0.4 inches in length and has an internal diameter of 0.006 inches or less. The short portion 31 of the third tube section 29 is preferably one quarter of the length of the entire third tube section 29. A plug type electrical contact 37 is fastened on the short portion 31 of the third tube section 29.

An actuator 39 extends nearly the entire length of the tactile element 1. The actuator 39 extends up the third tube section 29, through the first tube section 3, and into the second tube section 15. Preferably, a first end 41 of the actuator 39 is fastened inside the second tube section 15 to the uppermost point 27 of the third portion 25 of the second tube section 15. The second end 43 of the actuator 39 is fastened inside the third tube section 29. In preferred embodiments the third portion 25 of the second tube section 15 and the third tube section 29 are crimped for stronger fastening of the actuator 39.

In preferred embodiments of the tactile element 1, the actuator 39 is a shape memory alloy actuator. In one embodiment, the actuator is a fine Nitinol (TM) wire that is 0.003–0.004 inches in diameter and has a rated recovery force of 3–5 ounces.

When assembled, the tactile element 1 functions as a miniature cylinder (first tube section) and piston (second tube section) arrangement. The bottom end 7 of the first tube section 3 and the short portion 31 of the third tube section 29 extend downward into a pressurized medium. The pressurized medium is delivered through the port 13 in the first tube section 3 at a pressure of 3–5 PSI. The pressurized medium can be an hydraulic pressure medium or a pneumatic pressure medium. The pressure causes the actuator 39 in its elastic, or martensite, state to extend upward with a force in excess of the 0.7 ounces required for legible paperless Braille. In that extended position, the second tube section 15 of the tactile element 1 extends upward through a hole in a user contact surface. In preferred embodiments a plastic cap 45 is positioned over the third portion 25 of the second tube section 15 to improve "feel". As well as to provide electrical insolution. The hole in the user contact surface has a smaller diameter than the diameter of the second portion 23 of the second tube section 15. In the extended state, the tactile element 1 indicates information.

When a tactile element 1 is activated, a current, usually less than 500 milliamps, flows from the plug type electrical contact 37, through the actuator 39, through the second tube section 15 and into the first tube section 3. The actuator 39 heats due to electrical resistance. Once heated, the actuator 39 enters the austenite state and contracts. The actuator 39 preferably contracts 3–5% of its total length with a force of 3–5 ounces, depending on the cross-sectional area of the actuator material selected. The contracting actuator 39 exerts a force sufficient to overcome that of the pressurizing medium. The second tube section 15 is pulled down by the contracting actuator and drawn below the user contact surface. The large diameter of the second portion 23 of the second tube section 15 contacts the top end 5 of the first tube section 3 and stops the downward movement of the second tube section 15. In that position, the tactile element 1 indicates the absence of information.

As seen in FIGS. 2, 3, 6 and 7 the individual tactile elements 1 are combined in a tight fitting array 51 to produce a full page refreshable Braille-cell display. The display has multiple modules 53. Each module 55 carries a predetermined number of tactile elements. Preferably, the module has a narrow section of three-layered printed circuit board laid out as a row of twenty braille characters. The upper circuit board layer 47 is connected to a first row of tactile elements. That row of tactile elements corresponds to the top dots in a row of braille characters. The middle circuit board layer 48 is connected to a second row of tactile elements. That row of tactile elements corresponds to the middle dots in a row of braille characters. The lower circuit board layer 49 is connected to a third row of tactile elements. That row of tactile elements corresponds to the lower dots in a row of braille characters. Preferably, the first tube section of each tactile element is soldered to a circuit board layer. Each module has an upper surface 57 and a lower surface 59. A connecting fixture 61 is inserted in the circuit board and connected to each layer. A circuit board trace 63 extends from each layer through the fixture 61 to the row driver device. The connecting fixture 61 has a height equal to a distance between the upper surfaces of the modules and the main printed circuit board. In preferred embodiments, each circuit board layer carries twenty tactile elements. Plated through holes serve as the point of isolated connection to individual conductive layers. An alternative embodiment would utilize a single layer printed circuit board but is less desirable due to the critical spacing requirements.

Figures 3, 10:
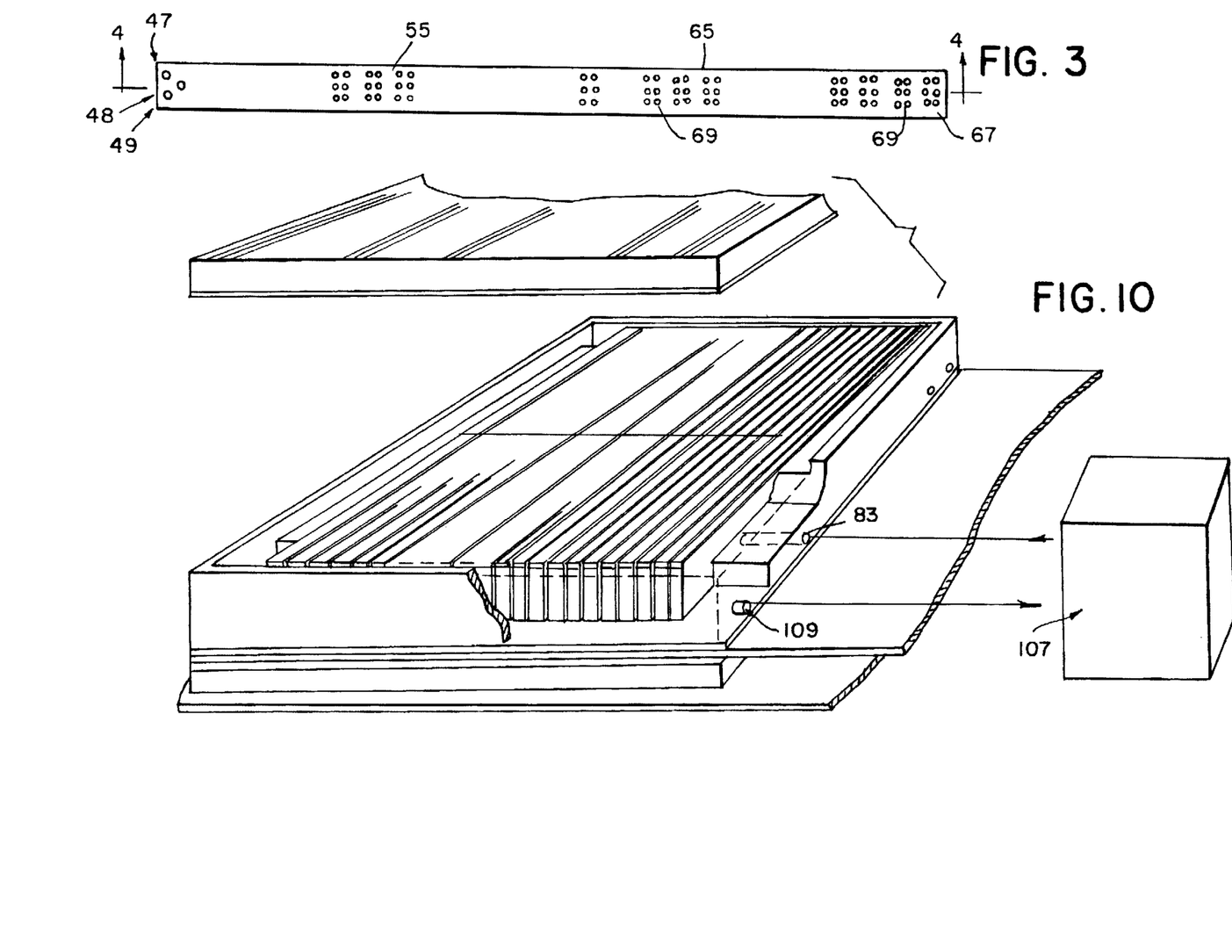
FIG. 3 is a bottom view of the block of FIG. 2.
FIG. 10 shows a hydraulic pump associated with the system.

As seen in FIG. 3, the circuit board and tactile element assembly is positioned in a block 65 having a bottom 67 and holes 69 in the bottom corresponding in position to the lower ends on the tactile elements. In preferred embodiments, the block 65 is plastic. The block has a thickness that allows the ports in the first tube section of each tactile element to protrude through the holes and beneath the bottom of the block. Preferably, the fit between the sides of the holes and the sides of the tactile elements is a gentle press fit. Adhesives and sealant are used if the fit is not tight.

At one end of the layered printed circuit board is positioned a means for connecting the individual dot rows to a row driver device. A separate row driver device is connected to a different layer of the circuit board.

A complete forty character row is formed by connecting left sided connector type module to a right sided connector type module. An alternative module version, a series connected row of modules of fewer characters are joined, with only a single three-terminal row driver device connector.

Figure 4:
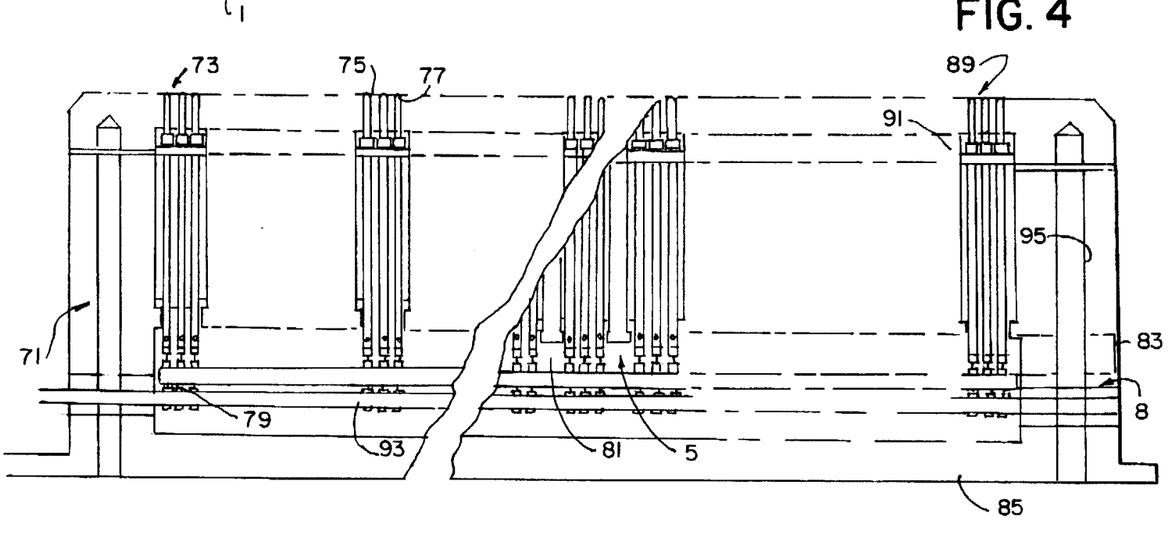
FIG. 4 is a cross-section of the array of FIG. 3 at IV—IV.

In FIG. 4, the assembled modules are placed in a row container fixture 71. The row container fixture is machined or molded to allow multiple rows of modules 73 to be assembled so as to represent Braille cells in standard placement, with standard separation between rows. The row container fixture 71 includes a plate 75 and multiple row slots 77 formed in the plate. In preferred embodiments, the plate is made of a plastic or aluminum, and the plate has a thickness of approximately one inch. Each row slot in the plate accommodates all modules required to form a forty cell row. The modules fit down inside of the row slot and rest on a narrow ledge positioned under the row slot. In preferred embodiments, the ledge 91 is positioned approximately 0.9 inches below the plate.

The ledge 91 is equipped with means for sealing the modules. That sealing means provides for a pressurized area 81 beneath the ledge. The pressurized area extends from the bottoms of the modules to a printed circuit board 93 positioned beneath the modules. The printed circuit board is arranged with sockets 79 connected in series to form the column electrical connections to the tactile elements. The sockets 79 receive the plug contacts extending from the third tube sections of the tactile elements.

The printed circuit board 93 is backed with a backing plate 85, such as a rigid aluminum plate. The entire pressurized area 81 between the printed circuit board and the bottom of the modules is surrounded around its perimeter by an air tight extension 87 of the row container fixture. Area 81 receives pressurizing medium via inlet 83. Preferably, the backing plate extends beyond the perimeter of the main printed circuit board and provides means for attaching an enclosure 95 around the entire device. In preferred embodiments, the display has an enclosure that frames the user contact surface and protects the electronics.

Figure 8:
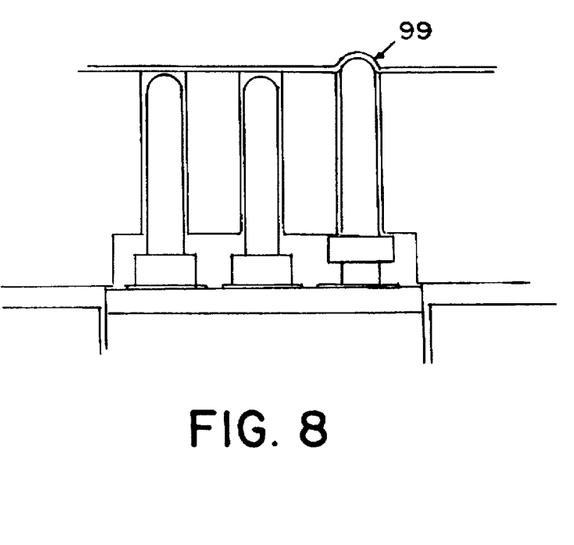
FIG. 8 is a close-up of a membrane covering the tactile elements in the module.

A user contact surface is positioned across the upper surface of the row container fixture with ledges 91 beneath the upper surface 89. The user contact surface has a hole pattern corresponding to the tactile elements positioned beneath the surface. A membrane 99 (see FIG. 8) seals the user contact surface in hydraulic embodiments. The holes have diameters such that only the third portion of the second tube section may protrude through hole. The underside of the user contact surface has spacers that apply pressure against the top surfaces of the modules. That pressure forces the modules downward against the sealing means of the ledge beneath each module. Preferably, the user contact surface is made of plastic or aluminum. An enclosure 101 is connected to edges of the user contact surface for surrounding and protecting the modules, container and circuit board and for framing the user contact surface. Backing plate 85 may extend beyond edges of the printed circuit board. Card connectors 105 are positioned on the main printed circuit board 93.

All the components of the display are secured together as a tight unit. In one embodiment, threaded bolts extend from beneath the backing plate, up through the backing plate, the printed circuit board and the row container fixture and into the user contact surface. Once the threaded bolts are properly tightened, the modules are sandwiched into an airtight assembly 95. When pressurized medium is introduced by a pump 107 (see FIG. 10) into the pressurized area between the printed circuit board and the sealed bottom surfaces of the modules, a mechanical biasing force is applied to the actuators in the tactile elements. Preferably, the pump maintains the pressure in the pressurized are between 3 and 5 PSI. When selected, an individual tactile element withdraws beneath the surface of the user contact surface and allows the remaining tactile elements to form a Braille character.

A close fit is established between the second tube section, or moving part, and first tube section, or stationary part, of the tactile element. That tight fit minimizes the amount of pressure medium that is allowed to escape, thereby reducing demand on the compressor or pump. The tactile elements are self-cleaning by virtue of the constant outward flow of medium. That self-cleaning feature reduces element failure due to accumulation of debris, thereby improving reliability so long as output from the pump or compressor is filtered.

In one embodiment of the present invention, the printed circuit board, which contains the series column connections to the individual tactile elements, is extended beyond the perimeter of the tactile element array. A means for connecting individual modules to row selection devices are accommodated on the extended printed circuit board. In a preferred embodiment, a connecting fixture is inserted in the printed circuit board at a position corresponding to the extensions of the three-layer printed circuit board of each module. Each separate layer of the layered circuit board is connected, through a connecting fixture, to a circuit board trace. The trace leads to a row selection device. Preferably, the connecting fixture has a height equal to that of the distance between the upper surfaces of the assembled modules and the main printed circuit board.

The selection devices and other related circuitry are positioned on the main printed circuit board behind the tactile array. Preferably, the devices and circuitry are provided with card edge connectors to allow portions of the circuitry to be oriented perpendicularly to the main printed circuit board.

Figure 9:
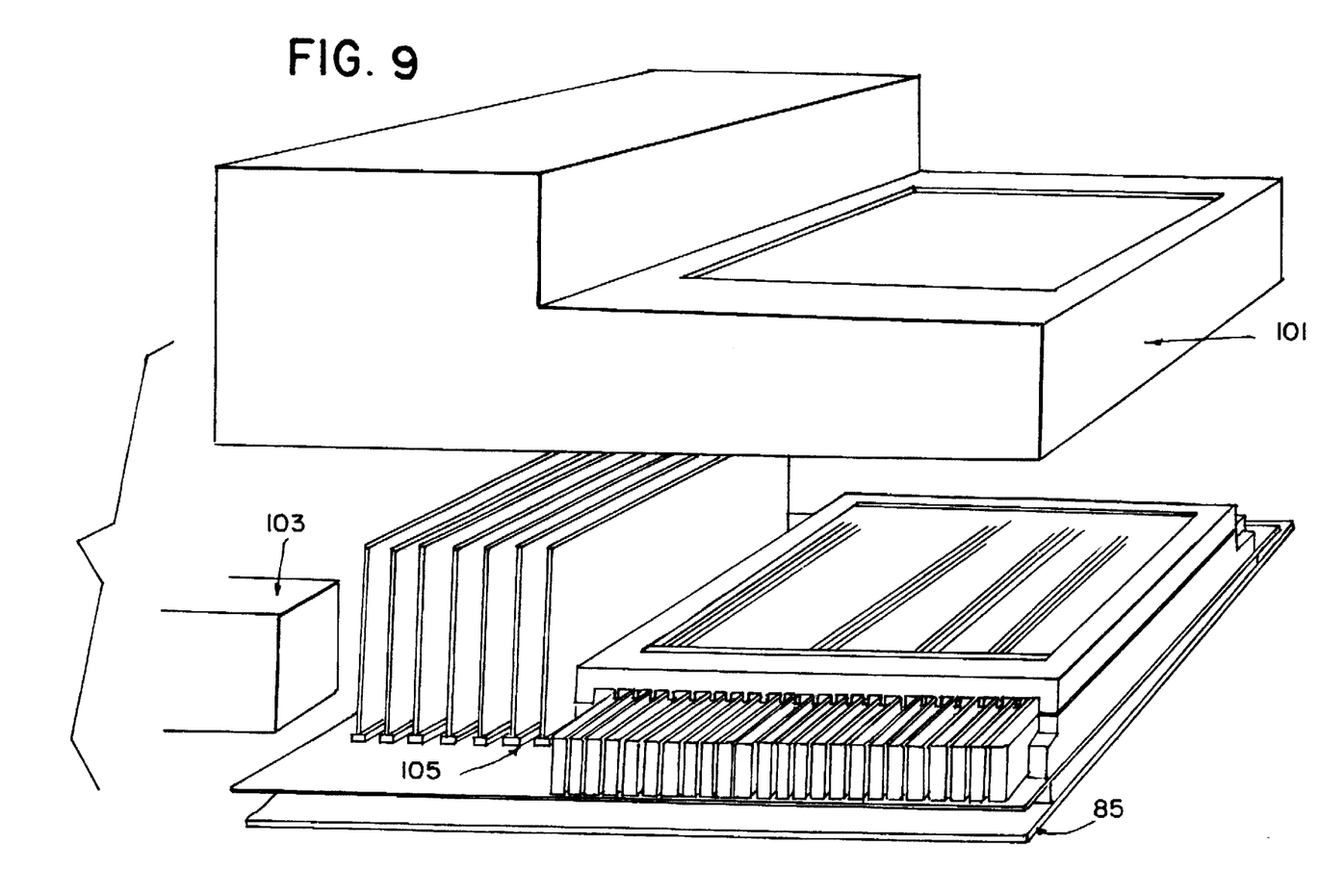
FIG. 9 shows an enclosure for surrounding the modules.

As shown in FIG. 9, the display can function using either an hydraulic pressurized medium or a pneumatic pressurized medium 103, such as compressed gas.

In FIG. 10, an hydraulically based embodiment of the refreshable Braille-cell display relies on fluid to apply a bias force to the second tube section of a tactile element. Unlike pneumatic embodiments, where compressed air is allowed to escape, the fluid used in hydraulic embodiments must be collected and recirculated once the fluid is leaked through the space between the first tube section and second tube section. The leaked fluid accumulates in the space between the user contact surface and the upper surface of the row of modules. A draining means 109 is provided in hydraulic embodiments for draining accumulated fluid back to a collection area. The pump can then reintroduce the fluid into the pressurized area.

Preferably, the hydraulic fluid has both high specific heat and high heat capacity for reducing cooling of the shape memory alloy actuators and for avoiding an increase in instantaneous power requirements. The hydraulic fluid needs to be noncorrosive and non-electrolytic. Possible hydraulic fluids include mineral oils and synthetic substitutes.

Figure 5:
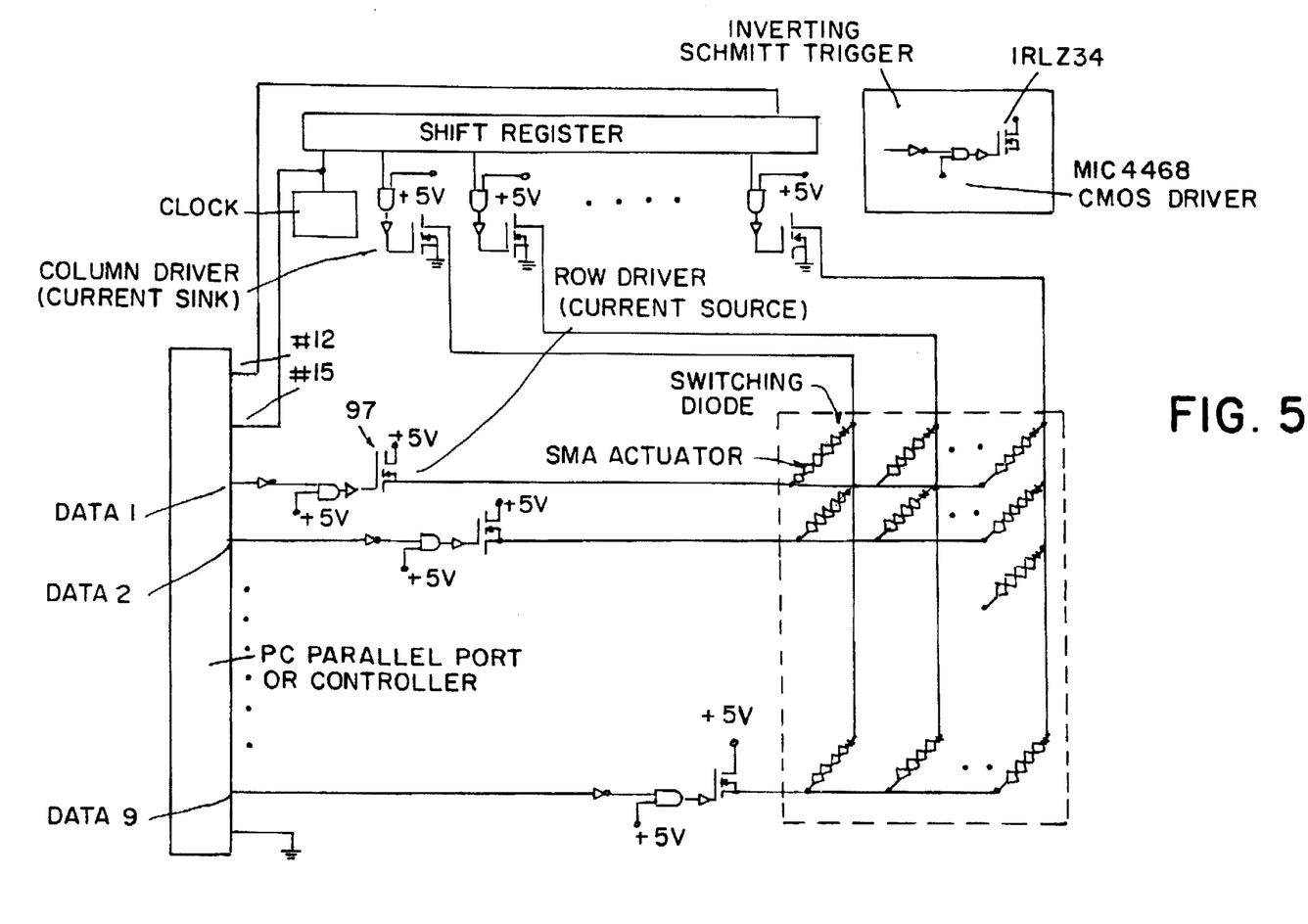
FIG. 5 is a block diagram showing the circuitry of the present invention.
Figure 6:
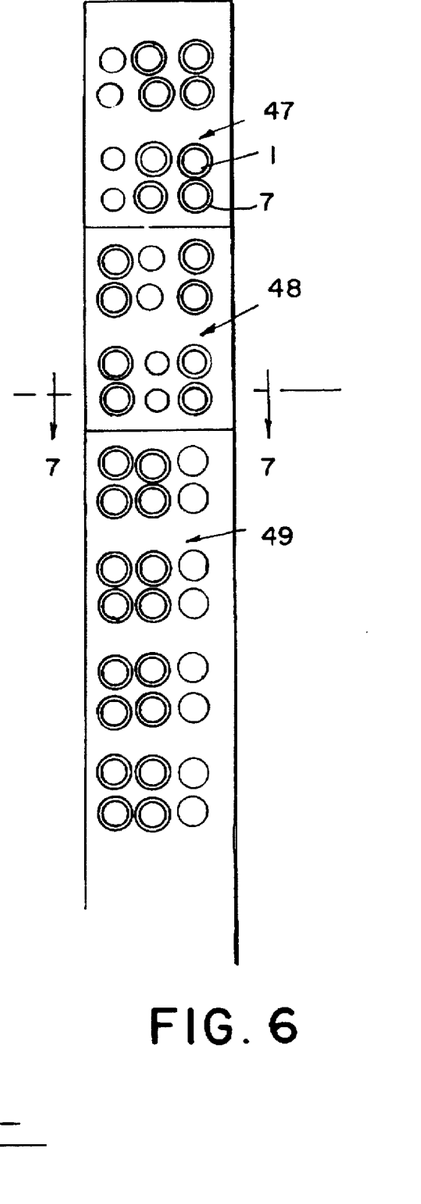
FIG. 6 is a detail of each module.
Figure 7:
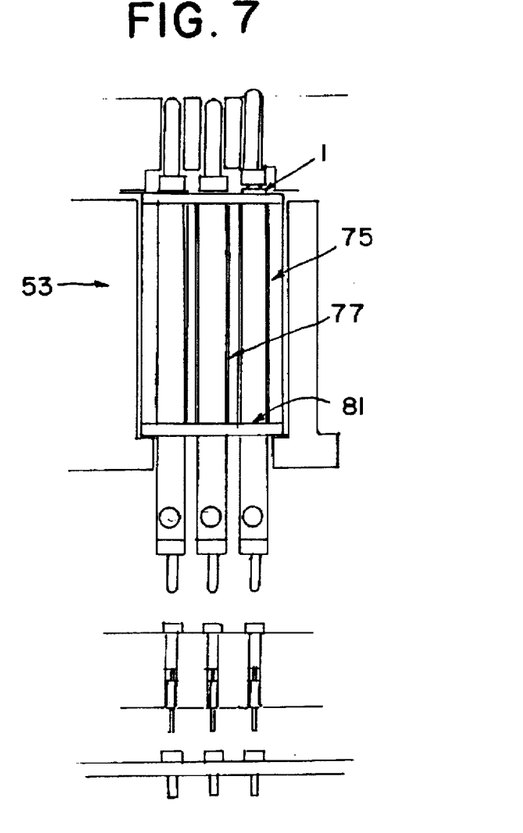
FIG. 7 is a cross-section of the module of FIG. 6 at VII—VII.

FIG. 5 shows a row driver device in the circuit diagram of the invention. The circuitry used in the present invention provides sequentially distributed pulse width modulation and allows individual tactile elements to be selected for activation. The circuitry includes a crossbar-type switch matrix. Current sourcing devices are connected in series to each array column, and current sinking devices are connected in series to each row in the array. With each individual tactile element connected to a sourcing line, and with the lower plug contact of each tactile element connected to a current sinking line, any element can be activated once its particular column and row current devices are selected. The column and row current devices are selected using logic and decoding circuitry by Amicro controller connected to the parallel port of a personal computer or by an internal mass storage device using either magnetic medium or compact disc technology which will directly load paging formation into a microcontroller.

The distribution of pulse width modulation to individual tactile elements is designed to reduce instantaneous power requirements. In one embodiment, sequentially activated portions of the array are synchronized with the duration of a single pulse width such that all selected elements remain legible though not continuously powered. In a second embodiment the individual columns are constantly sequenced by a clock driven shift register configured as a recirculating stepper circuit where one and only one column selecting parallel output is sequentially activated during each clock pulse. With the duty cycle so established by the shift register, at each clock pulse, the now activation pattern is synchronizer to convey the correct content for each successively activated column in order to represent a full page of Braille characters.

Reliability of individual tactile elements are electronically enhanced through periodic modulation of the pulse frequency while maintaining a constant duty cycle. When the pulse frequency is dropped below 200 Hz, individual activation pulses generate palpable vibrations that serve to shake loose any tactile elements that are stuck or frozen. If the pulse frequency is caused to decline suddenly to that frequency, through either modification of electronic hardware or modification of software, and then is returned instantly to a normal operating frequency of up to 1000 Hz, the entire operation would go unnoticed by the user.

Figures 11, 12, 13:
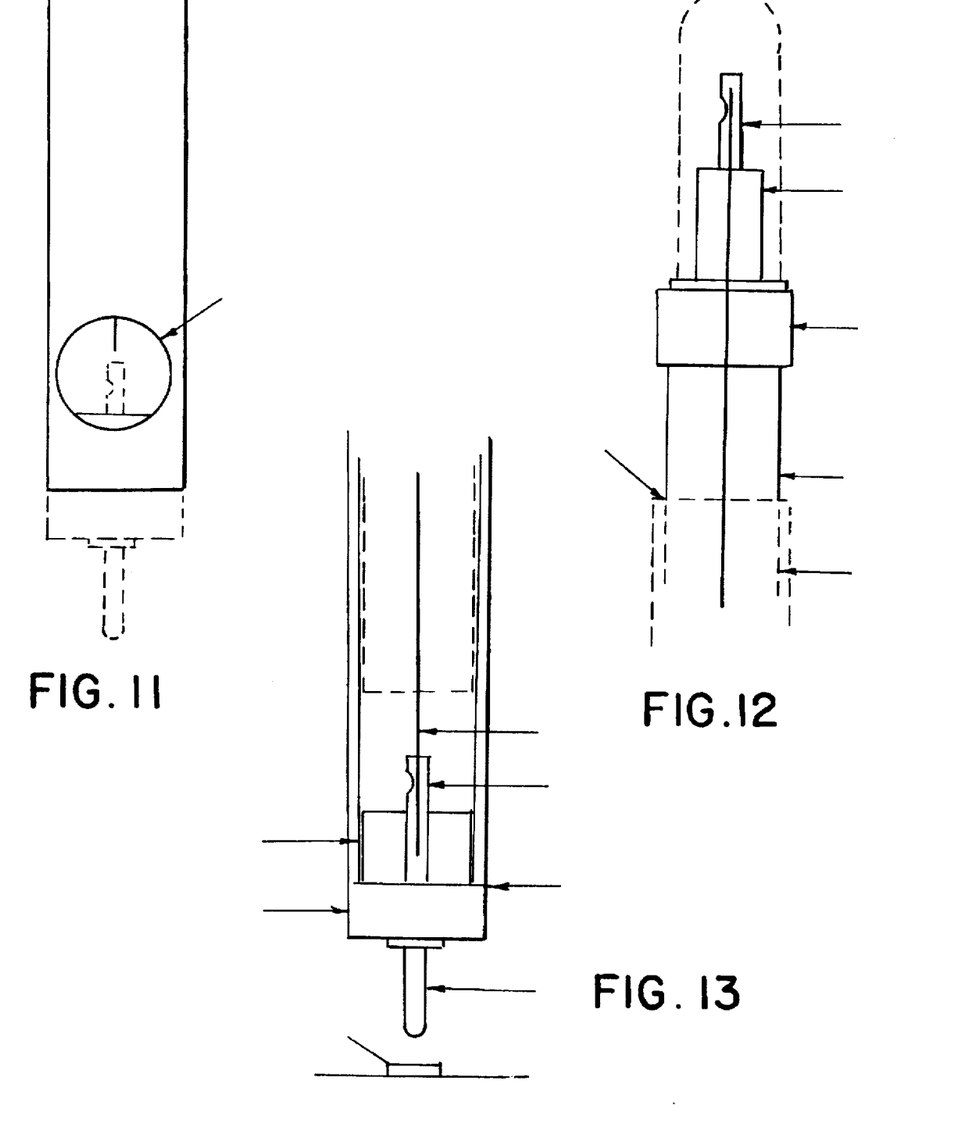
FIG. 11 is a perspective of a lower end of the tactile element.
FIG. 12 is a detail of an upper portion of the tactile element.
FIG. 13 is a detail of a lower end of the tactile element.

FIGS. 11, 12 and 13 show a perspective of a lower end of the hollow tube, and details of the upper end and the lower end of the tube of the invention that are assembled in the modules. The tactile elements are similar to that disclosed in FIG. 1.

While the invention has been described with reference to specific embodiments, modifications and variations of the invention may be constructed without departing from the scope of the invention, which is defined in the following claims.

I claim:

1. A tactile element apparatus for use in a refreshable braille display device comprising a first hollow tube section having a top end, a bottom end, an inner diameter, an outer diameter and a port positioned in the first tube section near the bottom end, a second tube section extending partially inside the first tube section and extending outward from the top end of the first tube section, the second tube section having a first portion having an upper end, a lower end and a diameter slightly less than the inner diameter of the first tube section such that the first portion of the second tube section slidably fits in the first tube section, a second portion extending from the upper end of the first portion and having a diameter larger than the inner diameter of the first tube section, and a third portion extending upward from the second portion, the third portion gradually decreasing in inner diameter, a third tube section positioned in the bottom end of the first tube section, the third tube section having a long section and a short section, the short section extending downward from the bottom end of the first tube section, a nonconductive bushing surrounding the long section of the third tube section, the bushing covered third tube section forcibly fitted in the bottom end of the first tube section, an electrical contact connected to the short section of the third tube section, and an actuator extending the length of the element, the actuator having a first end fastened inside the third portion of the second tube section and a second end fastened inside the third tube section.

2. The apparatus of claim 1, wherein the actuator is a shape memory alloy actuator.

3. The apparatus of claim 2, wherein the shape memory alloy actuator is made of Nitinol.

4. The apparatus of claim 1, further comprising a plastic cap positioned over the third portion of the second tube section.

5. The apparatus of claim 1, wherein the first tube section has a length of approximately 1.25 inches, the inner diameter of the first tube section is approximately 0.07 inches, the port has a diameter of approximately 0.05 inches and is centered approximately 0.2 inches from the bottom end of the first tube section, the second tube section has a length of approximately 0.75 inches, the first portion of the second tube section has an outer diameter slightly less than 0.07 inches, the second portion of the second tube section has a diameter in excess of 0.07 inches, the third portion of the upper section of the tube has a smallest inner diameter of 0.006 inches, the third tube section has a length of approximately 0.4 inches and an inner diameter of 0.006 inches or less, the short portion of the third tube section is approximately 0.1 inch and the actuator has a diameter of approximately 0.003 to 0.004 inches.

6. A full page refreshable braille display apparatus comprising multiple tactile elements, multiple modules, each module having an upper surface and a lower surface, and each module carrying a predetermined number of tactile elements, a row container for holding the multiple modules in a configuration that allows the tactile elements to represent braille cells in standard placement, the container having a plate with multiple slots for holding multiple modules, the modules fitting down inside the slots, and a ledge positioned under the plate such that lower surfaces of the modules rest on the ledge, the ledge further having a sealing means for providing a pressurized area beneath the ledge, a main printed circuit board positioned beneath the lower surfaces of the sealed modules, the printed circuit board having column connections connected in series for receiving plug contacts positioned on the tactile elements, a pressure medium distributed in the pressurized area positioned between the lower surfaces of the modules and the printed circuit board, a means for delivering the pressure medium to the pressurized area, a rigid backing plate positioned underneath the printed circuit board, an airtight extension extending from the row container and surrounding the pressurized area, a user contact surface positioned across a top surface of the container above upper surfaces of the modules, the user contact surface having an upperside, an underside, spacers extending from the underside for applying pressure against the upper surfaces of the modules to force the lower surfaces of the modules against the sealing means of the ledge, and a pattern of holes extending through the user surface, the pattern corresponding to positions of tactile elements in the modules beneath the upper surface, a row driver device positioned on the main printed circuit board and connected to the modules, a column driving device positioned on the main printed circuit board and connected to the modules, a controller connected to the row driving device and the column driving device for controlling activation of individual tactile elements, and connecting means for connecting the backing plate, circuit board, row container and user contact surface into an airtight assembly.

7. The apparatus of claim 6, wherein each module comprises a layered circuit board having a first layer, a second layer and a third layer, an equal number of tactile elements connected to the first layer, the second layer and the third layer, a block for housing the layered circuit board carrying the tactile elements, the block having a bottom and a thickness that allows lower ends of the tactile elements to extend beneath the bottom of the block, and block holes positioned in the bottom of the block, the block holes having diameters and positions acceptable for engaging sides of tactile elements, and wherein the row driver device is connected to the layered circuit board, the row driver device having a first terminal connected to the first layer, a second terminal connected to the second layer, and a third terminal connected to the third layer.

8. The apparatus of claim 7, wherein the first layer carries 20 tactile elements, the second layer carries 20 tactile elements and the third layer carries 20 tactile elements.

9. The apparatus of claim 7, wherein the tactile elements are soldered to the layered circuit board.

10. The apparatus of claim 7, further comprising a connecting fixture inserted in the printed circuit board and connected to each layer of the layered circuit board, and a circuit board trace extending from each terminal of each layer through the connecting fixture to the row driver device.

11. The apparatus of claim 10, wherein the connecting fixture has a height equal to a distance between the upper surfaces of the modules and the main printed circuit board.

12. The apparatus of claim 6, further comprising an enclosure connected to edges of the user contact surface for surrounding and protecting the modules, container and circuit board and for framing the user contact surface.

13. The apparatus of claim 6, wherein the backing plate extends beyond edges of the printed circuit board, and further comprising an enclosure connected to the backing plate and edges of the user contact surface such that the enclosure frames the user contact surface.

14. The apparatus of claim 6, wherein the means for delivering the pressure medium into the pressurized area is selected from the group consisting of a pump and a compressor.

15. The apparatus of claim 14, wherein the means for delivering the pressure medium into the pressurized area is an hydraulic pump, wherein the pressure medium is a fluid medium, and further comprising a drain means for transferring leaked fluid medium from a space above the upper surfaces of the modules back to the pump.

16. The apparatus of claim 15, wherein the fluid medium is a non-corrosive, non-electrolytic fluid.

17. The apparatus of claim 16, wherein the fluid medium has a high specific heat and a high heat capacity.

18. The apparatus of claim 17, wherein the fluid medium is selected from the group consisting of mineral oils and synthetic substitutes.

19. The apparatus of claim 15, further comprising a membrane positioned around the user contact surface for preventing leaking of the fluid medium.

20. The apparatus of claim 6, wherein the means for delivering the pressure medium into the pressurized area maintains pressure in the pressurized area between 3 and 5 PSI.

21. The apparatus of claim 6, wherein the pump is a pneumatic pump and the pressure medium is compressed gas.

22. The apparatus of claim 6, wherein the plate of the row container has a thickness of one inch.

23. The apparatus of claim 6, wherein the ledge is positioned approximately 0.9 inches below the plate of the row container.

24. The apparatus of claim 6, further comprising card connectors positioned on the main printed circuit board.

25. The apparatus of claim 6, wherein the connecting means are threaded bolts, and wherein the threaded bolts extend from beneath the backing plate, up through the backing plate, the main printed circuit board and the row container, and into the user contact surface.

26. The apparatus of claim 6, wherein the controller includes combinations of shift registers and a microcontroller.

27. The apparatus of claim 6, wherein each of the tactile elements further comprise a first hollow tube section having a top end, a bottom end, an inner diameter, an outer diameter and a port positioned in the first tube section near the bottom end, a second tube section extending partially inside the first tube section and extending outward from the top end of the first tube section, the second tube section having a first portion having an upper end, a lower end and a diameter slightly less than the inner diameter of the first tube section such that the first portion of the second tube section slidably fits in the first tube section, a second portion extending from the upper end of the first portion and having a diameter larger than the inner diameter of the first tube section, and a third portion extending upward from the second portion, the third portion gradually decreasing in inner diameter, a third tube section positioned in the bottom end of the first tube section, the third tube section having a long section and a short section, the short section extending downward from the bottom end of the first tube section, a nonconductive bushing surrounding the long section of the third tube section, the bushing covered third tube section forcibly fitted in the bottom end of the first tube section, an electrical contact connected to the short section of the third tube section, and an actuator extending the length of the element, the actuator having a first end fastened inside the third portion of the second tube section and a second end fastened inside the third tube section.

28. The apparatus of claim 27, wherein the first tube section is tightly fitted to the second tube section for minimizing escape of the pressure medium.

29. A method for providing a refreshable braille display by applying a bias force to multiple tactile elements via a common reservoir of pressure comprising the steps of extending a lower end of a tactile element in a pressurized area, delivering pressure medium into the pressurized area, exerting pressure on the tactile elements through ports in the lower ends of a tactile elements, causing actuators in the tactile elements to expand, extending upper sections of the tactile elements through holes in a user surface, activating individual tactile elements, applying a current from an electrical contact through the actuator of the activated tactile elements to an outer tube section of the activated tactile elements, heating the actuators in the activated tactile elements through electrical resistance, decreasing lengths of the actuators in the activated tactile elements, exerting a downward force on the pressure medium, and pulling the upper sections of the activated tactile elements beneath the user contact surface.

30. The method of claim 29, wherein activating individual tactile elements further comprises rapidly selecting sequentially activated portions of an arrays of tactile elements to create a virtual page.

31. The method of claim 29, further comprising constantly sequencing columns of tactile elements while presenting synchronized row activation patterns.

32. The method of claim 29, further comprising periodically modulating pulse frequency and maintaining a constant duty cycle for electronically enhancing the reliability of tactile elements.

* * * * *